United States Patent
Nitsch

(10) Patent No.: US 7,283,600 B2
(45) Date of Patent: Oct. 16, 2007

(54) PROCEDURE FOR SEIZING THE BEGINNING OF AN ACTIVE SIGNAL SECTION

(75) Inventor: Bernhard Nitsch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 782 days.

(21) Appl. No.: 10/676,559

(22) Filed: Sep. 30, 2003

(65) Prior Publication Data

US 2004/0153874 A1    Aug. 5, 2004

(30) Foreign Application Priority Data

Oct. 23, 2002  (DE)  ................ 102 49 413

(51) Int. Cl.
*H04L 27/06* (2006.01)

(52) U.S. Cl. .................................... 375/343

(58) Field of Classification Search ............... 375/142, 375/147, 150, 260, 343
See application file for complete search history.

(56) References Cited

U.S. PATENT DOCUMENTS

| | | | |
|---|---|---|---|
| 4,621,365 A | 11/1986 | Chiu | |
| 5,909,471 A * | 6/1999 | Yun | ............................ 375/343 |
| 6,363,131 B1 | 3/2002 | Beidas et al. | |
| 2002/0168034 A1 | 11/2002 | Yang et al. | |
| 2004/0141457 A1* | 7/2004 | Seo et al. | .................... 370/203 |
| 2004/0264584 A1* | 12/2004 | Labs et al. | .................. 375/260 |

FOREIGN PATENT DOCUMENTS

| | | |
|---|---|---|
| DE | 197 33 825 A1 | 2/1999 |
| DE | 100 54 517 A1 | 5/2002 |
| DE | 101 12 773 A1 | 9/2002 |

* cited by examiner

*Primary Examiner*—Young T. Tse
(74) *Attorney, Agent, or Firm*—Caesar, Rivise, Bernstein, Cohen & Pokotilow, Ltd.

(57) ABSTRACT

A process for detecting initiation (BB) of an active packet or burst in a digital received signal r(v) during use of a digital reference signal p(v) includes: (a) executing a correlation (S102, S103) by forming a cost function $L(v_0)$ with a correlation function within a correlation function interval dependent upon a time delay of the received signal r(v) relative to a bit offset or a chip offset $v_0$ characterized by reference signal p(v), whereby the addends of the correlation function were multiplied with a frequency offset correction factor, namely $e^{-j2\pi\Delta f v}$, which factor was characterized with a frequency offset $\Delta f$ of received signal r(v) relative to the reference signal p(v); and (b) seeking a maximum Max(L) of cost function $L(v_0)$ dependent upon the bit offset or the chip offset $v_0$ and upon the approximate frequency offset $\Delta \tilde{f}$ whereby maximum Max(L), following a discrete Fourier Transform (FFT) is sought in the frequency space.

7 Claims, 3 Drawing Sheets

PROCEDURE FOR SEIZING THE BEGINNING OF AN ACTIVE SIGNAL SECTION

BACKGROUND OF THE INVENTION

The invention concerns a process for the determination of the start of an active signal packet, which is also known as a "burst".

In a case of a wireless LAN-network, and also with other applications, especially regarding mobile radio transmission, digitally modulated signals are emitted in the so-called bursts. That is to say, the signal is only transmitted by bursts. Exclusive of the bursts, there is no transmission. The burst is identical with the term signal section, or signal packet.

In particular, in the case of systems transmitting evaluation data for a Radio LAN System, and also for other mobile radio signals, determination must be made of the start of the active signal packet, that is to say, the chronological burst beginning position. The received signal is next continually received, and it is in the received signal that the start of the active signal packet is to be determined.

Up to this time, it was a conventional practice, that for the determination of the beginning of an active signal packet, correlation procedures without correction for frequency were employed. As to the state of the technology, reference can be made to DE 100 54 517 A1, which deals with an effective synchronization including a reference sequence, namely pn-sequence. Since the said pn-sequence in the case of said employment had a very long periodicity, the proposal was made, to form subinterval groups, and by means of appropriate linear, pair arranged placements and interrupted summations of these subintervals, the troublesome correlation could be shortened. An application in connection with the determination of the beginning of an active signal packet, however, is not described in the cited example.

Disadvantageously, where the prior known correlation procedure was employed, is that the length of the correlation in the presence of a (as a rule) readily available frequency offset between the received signal and the reference signal is limited. Following a phase rotation of 180° between the received signal and the reference signal, the additional correlation-products offer no constructive advantages.

Thus the invention has the purpose of making available a process for the determination of the start of an active signal packet in a digital received signal with the use of a digital reference signal, whereby the correlation between the received signal and the reference signal is so improved, that a correlation of a more lengthy correlation-length can be carried out.

SUMMARY OF THE INVENTION

The invention assumes the knowledge, that the correlation length can be extended, if a correction factor for frequency distortion is called upon, which can incorporate the frequency distortion between the received signal and the reference signal. Furthermore, based on the achievement of the purpose of the invention, the knowledge is expected, that the maximum of the correlation can be determined by a maximizing of a cost function, wherein the sought, time-related, bit offset or chip offset between the received signal and the reference signal on the one hand, and the subsequent unknown frequency distortion between the received signal and the reference signal on the other hand, make up the variation parameter. The maximizing of the cost function in regard to the frequency distortion can be assumed in accordance with a further invention teaching including a grid search by means of a Fourier-Transform. In this way, the maximum is sought, subsequent to an execution of a discrete Fourier-Transform in the frequency range. In other words, the maximum of the cost-function becomes evident from the maximum of the amplitude or power spectrum.

The correlation can be carried out in several time related offset correlation-intervals, whereby the correlation-interval, as compared to the state of the technology can, however, be substantially prolonged by means of the invented frequency correction factor. Then, the arrived at correlation results corresponding to individual correlation intervals, can be incoherently determined for the increasing of the detection security.

Furthermore, it is of advantage, to limit the correlation to a range, wherein the power of the received signal is greater than a given power threshold. The momentary power can then, advantageously, be calculated by a sliding average value.

The invention further provides a computer program, i.e., a product of a computer program for the execution of the invented process, that is to say, a digital storage medium, upon which control signals for the carrying out of the invented process can be digitally stored.

BRIEF DESCRIPTION OF THE DRAWINGS

An embodiment of the invention is described in the following with reference to the drawing. The drawings show.

DETAILED DESCRIPTION OF PREFERRED EMBODIMENTS

In the course of a modulation quality analysis of a sender, for example, of the radio LAN-System of the IEEE802.11B Standard, but including also other mobile radio systems, the position of the sent bursts in the received signal r(v) was detected. The position of a burst is, among other things, determined by the burst start position. In this patent application, a process for the detection of the burst start position is described in one received signal r(v) which is disturbed by a high frequency fault.

In the following, the exemplary model of the sender corresponding to the invented process and the transmission conception of the measurement stretch is presented.

Figure 1:
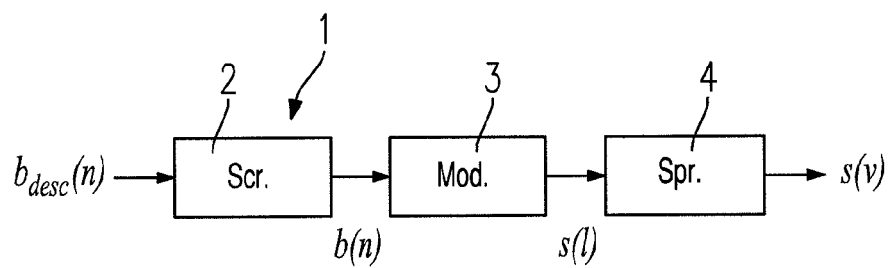
FIG. 1 a model construction of the invented process, based on the sender.

In FIG. 1 is presented an example modification of the sender 1. After a scrambling of the bit signal $b_{desc}(n)$ by means of the scrambler 2, the scrambled bit-signal b(n), dependent upon the employed type of modulation, is modulated in a modulator 3. Subsequently, the modulated symbols s(l) are spread in the spreader 4 with a spreading code. At the output of the spreading apparatus 4, the sending signal s(v) is now available.

In the case of a transmission system in accord with IEEE802.11B Standard, the scrambler (2) is comprised of a retroactively connected shift-register with seven delay elements. As a type of modulation, in this case, a differential BPSK (DBPSK), a differential modulator (DQPSK), a "Complementary Code Keying" (CCK) or a "Packet Binary Convolutional Coding" (PBCC) are used. As a spreader code, a Barker-Code is employed. This is only mentioned to serve as an example. The invention is not limited to this application.

The transmission system of the IEEE802.11B Standards is burst-oriented. That means, the data are not chronologically successive, but are in data packets while active bursts are being transmitted. Between two bursts, no transmission exists.

At the beginning of each burst, a preamble is sent, the bit sequence of which $p_{desc}(n)$ is known. By means of the operations of scrambling, modulation and spreading, the reference signal $p(v)$ of the preamble can also be calculated.

Figure 2:
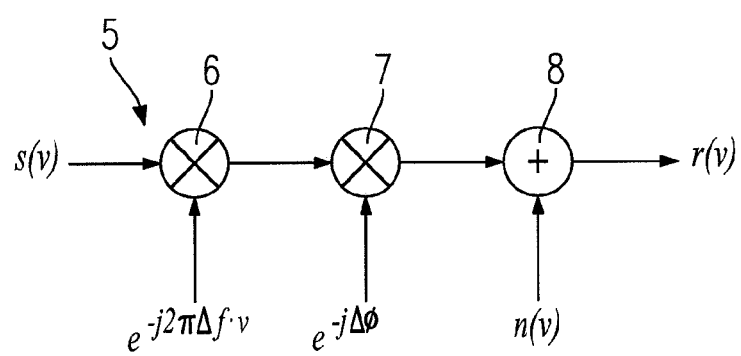
FIG. 2 the transmission model of the measurement range for the invented process, FIG. 3 an IIR-Filter of the first order to determine the momentary power, FIG. 4 a diagram exhibiting the time related relation of the momentary power, the received signal and the reference signal, FIG. 5 a diagram explaining the problem involvement upon the correlation without the invented frequence correction factor, and FIG. 6 a flow diagram of the invented process.

In FIG. 2 is presented the transmission model 5 of the measured stretch. The sending signal besides a frequency offset $\Delta f$ and a phase offset $\Delta\phi$ is distorted by a noise factor, namely $n(v)$: wherein $$r(v) = s(v) \cdot e^{-j2\pi\Delta f v} \cdot e^{-j\Delta\phi} + n(v) \quad (1)$$

and where v is the chip index. If no spreading occurs, which is no presupposition of the invention, then v would be the bit-index. In the example presented in FIG. 2, the frequency displacement is modulated by a first multiplier 6, the phase offset by a second multiplier 7 and the noise modulated by an additive 8.

The detection of the burst inception position is done in a preferred embodiment example, with a two stage detection process. In a first detection step, in the received signal $r(v)$ signal ranges are determined, which exhibit a sufficient strength of signaling. In these ranges, the second burst inception will be looked for in a second step.

The detector for the determination of signal ranges with appropriate signal strength undertakes the task of setting the borders around the search area for the detection of burst start positions. In this way, the efforts to complete the following correlation in the case of the burst inception position are reduced.

The detection of signal ranges with a sufficient power is based, obviously, on that power. With an IIR-filter of the first order, the momentary signal strength, namely:

$$P(v) = \lambda \cdot P(v-1) + (1-\lambda) \cdot |r(v)|^2 \quad (2)$$

can be estimated.

Figure 3:
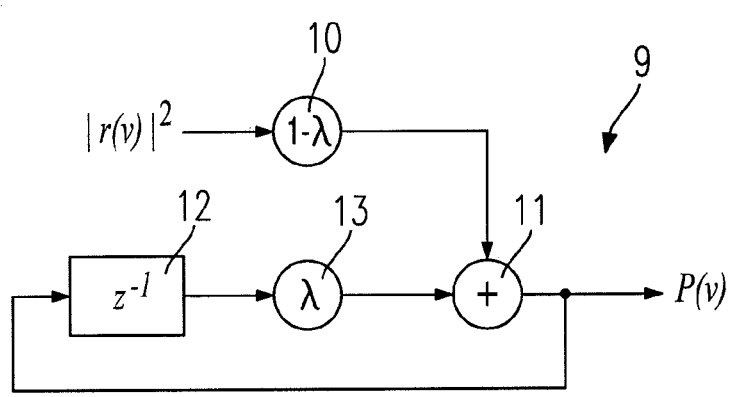

FIG. 3 demonstrates the advantageously applied IIR-Filter. The quantity square of the strength of the received signal, $|r(v)|^2$, is brought to a first entry of an adder 11, by means of a damping element 10, i.e., that damping element, which the individual chips, that is the bits, of the squared signal strength $|r(v)|^2$ multiplied by the constant factor $1-\lambda$. The constant $\lambda$ is greater than 0 and less than 1, in general, only slightly less than 1. The output of the adder 11, by means of a delay element 12, in which a time delay is made about one chip, i.e., one bit, and by means of which a second damping element 13, in which the chip result, i.e., the bit result, is multiplied with $\lambda$ is retro-coupled onto the second entry of the adder 11. In this way the equation 2 is reconstructed.

In the range of signals, in which the momentary strength, i.e.

$$P(v) \geq TH \cdot MIN\{P(v)\} \quad (3)$$

oversteps the relative signal strength threshold of TH·MIN {P(v)}, which, by means of the minimal signal strength MIN {P(v)} is relativized, is sought after the position of the burst initial position.

Figure 4:
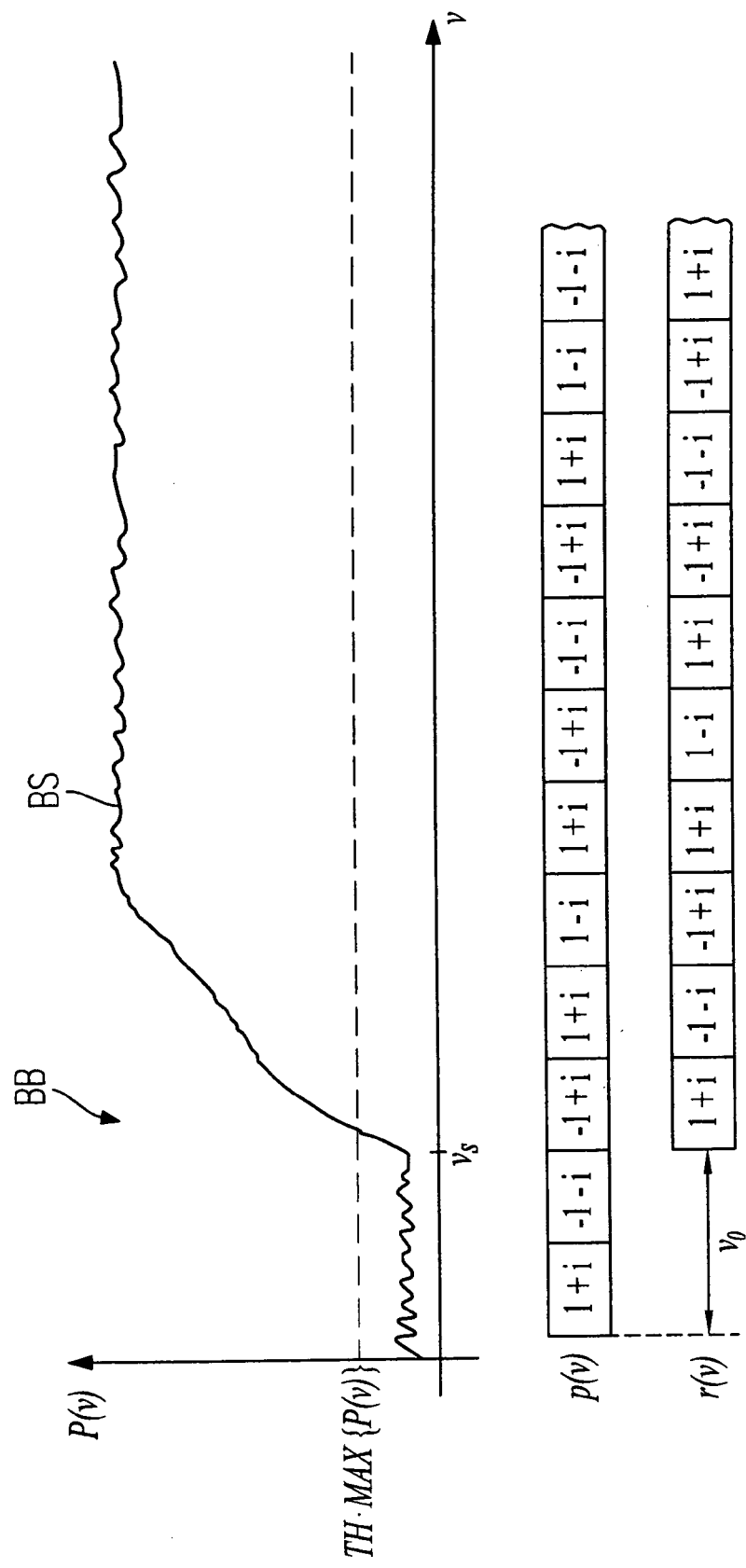

FIG. 4 shows the momentary (or instantaneous) signal strength P(v) as a function of the chip index v. From the chip index $v_s$ begins the active burst. At this location, lies the sought for initiation BB of the active signal packet BS, that is, the initial burst position. Because of the fact, that the momentary signal strength in accord with Eq. (2) will be calculated as the sliding average value, in which with a greater weighting, the previous momentary signal strength P(v-1) and with relatively lesser weighting the signal strength of the presently existing chips $|r(v)|^2$, then the so defined momentary signal strength P(v) slowly climbs from the beginning of the active signal packet BS, until it reaches saturation. After the overstepping of the signal strength threshold TH·MIN {P(v)} begins the more exact search for the initiation of the burst BB with the correlation process to be described in the following.

For the detection of the incipient burst, a correlation procedure of the received signal r(v) is applied along with the reference signal p(v). To this purpose, in a first step, the correlation function is computed between a received signal packet of N keyed values and the reference signal p(v), which function is represented by:

$$R_{r,p}(v_0, k) = \frac{1}{N} \cdot \sum_{v=0}^{N-1} r(v + k \cdot N + v_0) \cdot p^*(v + k \cdot N) \quad (4)$$

$$= \frac{1}{N} \cdot \sum_{v=0}^{N-1} \hat{R}_{r,p}(v, v_0, k)$$

For the purpose of increasing the correlation advantage, subsequently K individual correlations-results are incoherently determined:

$$\tilde{R}_{r,p}(v_0) = \frac{1}{K} \cdot \sum_{k=0}^{K-1} |\tilde{R}_{r,p}(v_0, k)|^2 \quad (5)$$

The start position of the burst is that position in the received signal, wherein the determined correlation function is maximal, as follows:

$$BurstStartIndex = \underset{V_0}{MAXINDEX}\{\tilde{R}_{r,p}(v_o)\}. \quad (6)$$

This, with the description of the process with the aid of the equations (4) to (6) does not yet contain the frequency offset factor of the invention and, on this account, yields, only in a disadvantageous manner, a small partial correlation length N.

With an increasing frequency offset $\Delta f$ the detection security of the above described process declines, since the inner correlation products, namely $\hat{R}_{r,p}(v,v_0,k)$ of the sum in equation (4), have a different phase and, consequently, can no longer completely and constructively overlay one another. After a phase rotation of 180° in reference to the first inner correlation product, namely, $\hat{R}_{r,p}(v=0,v_0,k)$, additional inner correlations products contribute no further constructive advantages. On this account, this maximum, allowable, partial correlation length, without the invented frequency correction factor, $$N_{max} < \frac{\pi}{2\pi\Delta f} \quad (7)$$

is dependent upon the available frequency offset $\Delta f$ In the case of a frequency offset of $10^{-2}$ of the chip-rate, the partial correlation length N must be chosen, for example, at less than 50 chips.

Figure 5:
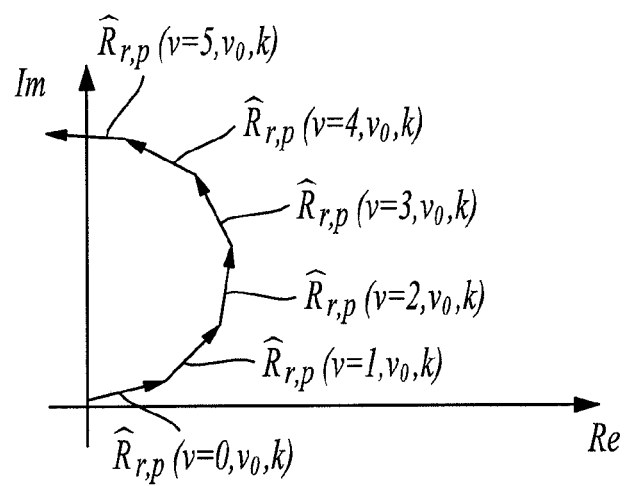

FIG. 5 presents a formerly explained set of problems in a somewhat excessive manner. What is shown is actually, the Vector $\hat{R}_{r,p}$ of the inner correlation products of the equation (4). The summation regarding the individual inner correlations products, namely $\hat{R}_{r,p}(v,v_0,k)$ allows the correlation result $R_{r,p}(v_0,k)$, which corresponds to a vector addition to the inner correlation products $\hat{R}_{r,p}(v,v_0,k)$.

In the said presentation of the FIG. 5, it can be recognized, that in the case of the sixth inner correlation product, namely $\hat{R}_{r,p}(v=5,v_0,k)$ a phase rotation of 180° is attained in reference to the output point of the first inner correlation product, $\hat{R}_{r,p}(v=0,v_0,k)$. The addition of the inner correlation product, $\hat{R}_{r,p}(v=5,v_0,k)$ thus has no further constructive contribution.

In accord with the invention, greater partial correlation lengths should be employed, in order to support the detection security. On this account, the frequency offset must be given consideration from the standpoint of a detection algorithm. The detection of the burst start position is done, in accord with the invention, with the following decision metrics, wherein, for each hypothesis $v_0$ of the burst start position, the cost function $$L(v_0, \Delta \tilde{f}) = \left| \sum_{v=0}^{N-1} r(v-v_0) p^*(v) \cdot e^{-j2\pi\Delta \tilde{f} v} \right| \quad (8)$$

is maximized. The cost function $L(v_0,\Delta \tilde{f})$ contains the correlation function:

$$\sum_{v=0}^{N-1} r(v-v_0)p^*(v)$$

which carries out a correlation regarding a correlation interval of N chips. In accord with the invention, that addend $r(v-v_0) \cdot p^*(v)$ is corrected by means of a frequency correction factor $e^{-j2\pi\Delta \tilde{f} v}$. Thereby, the phase displacement is compensated, which displacement took place due to the frequency offset, which was explained under FIG. 5.

The maximization of the cost function $L(v_0\Delta \tilde{f})$ from equation (8) is, in accord with the invention, undertaken by a grid search by means of a Fourier-Transform, since it is obvious, that the equation (8) presents a Fourier-Transform. The endeavor to find the maximum of the cost function Max(L) can also be very easily carried out in the frequency space. The approached estimation for the maximum of the cost function:

$$|\tilde{R}(f, v_0)| = \left| \sum_{v=0}^{N_{FFT}-1} r(v-v_0)p^*(v) \cdot e^{-j\frac{2\pi}{N_{FFT}} \cdot f v} \right|. \quad (10)$$

which may also be arrived at from the maximum of the power spectrum, namely $$\Delta f_{error} = \frac{1}{2 \cdot N_{FFT}} < \frac{\pi}{2\pi \cdot N'} \quad (12)$$

In the decision process, with hypothesis for the start position BB of the active signal burst (BS) being assumed, according to which, the decisive metric, as follows, becomes maximal:

$$MAX\{L\} \approx \underset{f}{MAX}\{|\tilde{R}(f, v_0)|\}, \quad (9)$$

The frequency resolution of the Fourier Transform must at least be that small, that it may safely be assumed, that the frequency error $$BurstStartIndex = \underset{v_0}{MAXINDEX}\left\{\underset{f}{MAX}\{|\tilde{R}(f, v_0)|\}\right\} \quad (11)$$

which, by a scan in the frequency range is found smaller than the frequency offset, which a phase rotation of 180° can bring about by the partial correlation length. In this case, it is assured, that the inner correlation product in equation (8) will lay itself over, i.e. is congruent. If one chooses the length NFFT as a double potential, then the numerical complexity of the detection process can be diminished by the application of a "Fast Fourier Transform" instead of a general Fourier transform.

Figure 6:
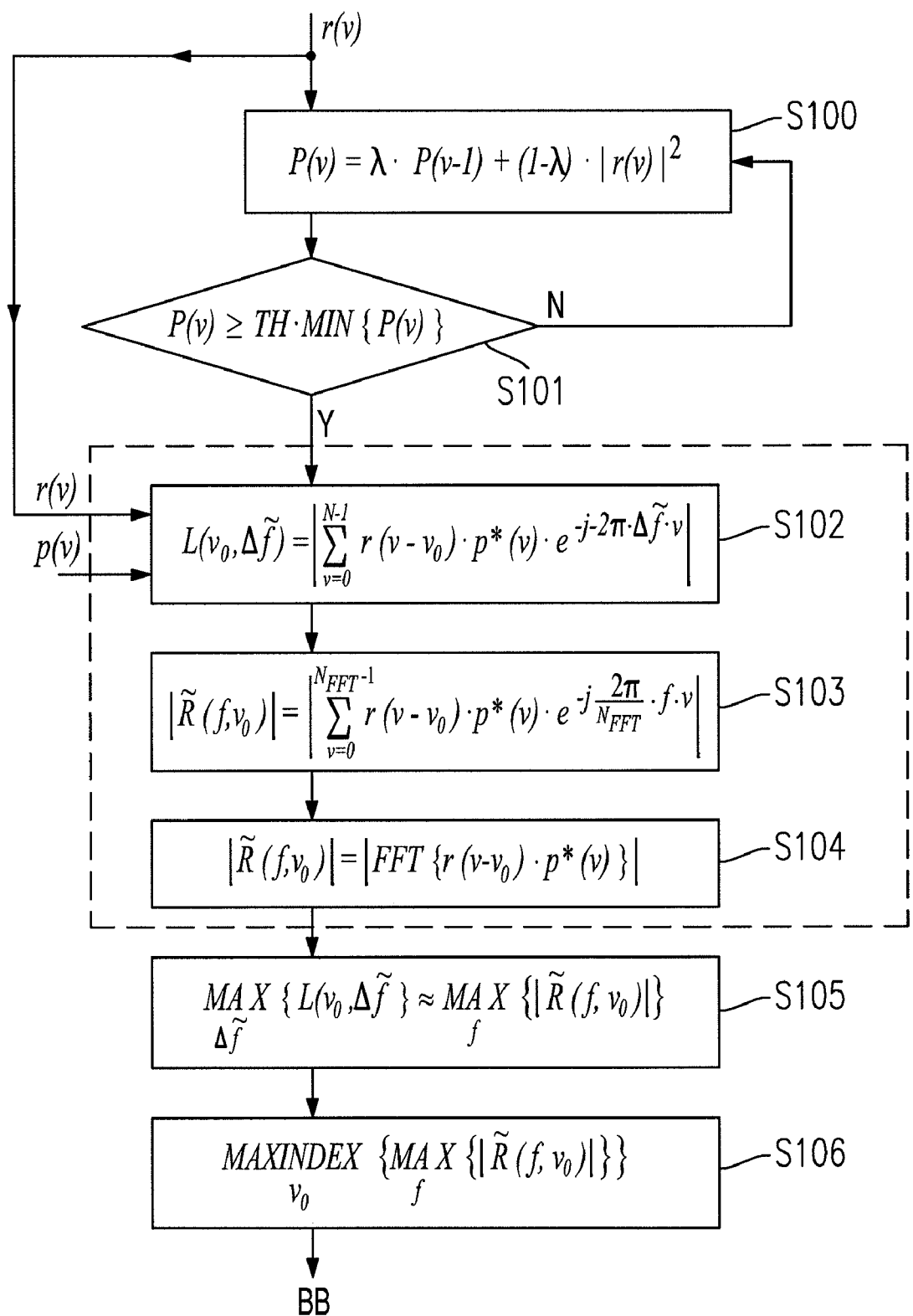

FIG. 6 shows the above described, invented process in a panoramic view with the aid of a continuing flow diagram.

To begin with, in an optional process step S100, the instantaneous power P(v) of the received signal r(v), which is set forth in equation (2) and in a likewise optional process step S101 a comparison thereof is made with the power threshold TH·MIN {P(v)} representing equation (3). If the power threshold is not yet overstepped, then in step S100, once again, the instantaneous power P(v) is recalculated. If now the power threshold is overstepped, then the process continues successively with the steps S102, S103 or S104 and, in accordance with equation (8) the cost function or the corresponding equation (10) of the power spectrum, namely |R(f,v₀)| or the corresponding step S104 calculates the appropriate Fourier Transform.

By means of the Fast Fourier Transform in step S104, the maximum of the cost function, which approaches the maximum of the power spectrum, is especially efficiently computed and therefrom the start BB of the active burst BS is determined, first by a search for the maximum in step S105, with reference to the frequency f and second by a maximal search in step S106 with regard to the bit or the chip offset $v_0$ is determined.

The development, in accord with the invention, has been, in the foregoing, described with the aid of the equations (8)

to (11), but only in regard to a few partial correlation lengths for k=0. That is to say, the addend k·N, in keeping with the equation (4) was omitted from the equations (8) and (10) for the sake of simplification. It can be, that the achieved correlation length is so long, because of the invented process, that the carrying out of several partial correlations, which then must be incoherently determined in accord with equation (5), is not a necessary step. The numeric amount and the memory amount in the case of a correlation in regard to a correlation of such a length is very great. It is of advantage, if the invented process is only carried out in regard to observable partial correlation length, such as described in equations (4) to (6), however, at the same time, with consideration given to the invented frequency correction factors. Following this, an incoherent determination in regard to the partial correlation results can be undertaken.

The preliminary power detection determined with the aid of the equations (2) and (3) is advantageous, but only optional, and within the framework of the present invention, can be omitted.

What is claimed is:

1. A process for detecting an initiation of a burst in a digital received signal r(v) during use of a digital reference signal p(v), said process comprising the following procedural steps:

executing a correlation by formation of a cost function $L(v_0)$ with a correlation function within a correlation interval dependent upon a time delay of the received signal r(v) relative to a bit offset or a chip offset $v_0$, which is characterized by the reference signal p(v), whereby addends of the correlation function were multiplied by a frequency offset correction factor, namely $e^{-j2\pi\Delta \tilde{f} v}$, the frequency offset correction factor being characterized by a frequency offset $\Delta \tilde{f}$ of the received signal r(v) relative to the reference signal p(v); and seeking a maximum Max(L) of the cost function $L(v_0)$ dependent upon the bit offset or the chip offset $v_0$ and upon the frequency offset $\Delta \tilde{f}$ whereby the maximum Max(L), following a carrying out of a Fourier Transform is sought in a frequency space.

2. The process of claim 1, wherein the cost function $L(v_0)$ is formed corresponding to the equation:

$$L(v_0, \Delta \tilde{f}) = \left| \sum_{v=0}^{N-1} r(v-v_0)p^*(v) \cdot e^{-j2\pi\Delta \tilde{f} v} \right|$$

wherein:

r(v) is the received signal v is a bit index or a chip index p*(v) is a conjugate complex reference signal $v_0$ is the bit offset or the chip offset $\Delta \tilde{f}$ is the frequency offset, and N is a length of the correlation interval.

3. The process of claim 2, wherein the maximum Max(L) of the cost function $L(v_0)$, by the determination of the maximum of a power spectrum, is sought in the frequency space, said power spectrum being:

$$\left| \tilde{R}(f, v_0) \right| = \left| \sum_{v=0}^{N_{FFT}-1} r(v-v_0)p^*(v) \cdot e^{-j\frac{2\pi}{N_{FFT}} \cdot f \cdot v} \right|$$

wherein $N_{FFT}$ is a length of a discrete Fourier Transform, and f is an estimated frequency offset $\Delta \tilde{f}$ multiplied by $N_{FFT}$.

4. The process of claim 1, wherein the correlation is executed in a plurality of time related offset correlation intervals K·N and the thereby obtained correlation results $R_{r,p}(v_0, k)$ are incoherently determined.

5. The process of claim 1, wherein before the correlation an instantaneous power P(v) of the received signal r(v) is determined and the correlation is only executed in one range, wherein the instantaneous power P(v) is greater than a power threshold TH·MIN {P(v)}.

6. The process of claim 5, wherein the instantaneous power P(v) is determined by the equation:

$$P(v)=\lambda \cdot P(v-1)+(1-\lambda)\cdot |r(v)|^2$$

wherein:

r(v) is the received signal v is a bit index or a chip index

λ is a constant greater than 0 and less than 1.

7. A digital memory storage medium with electronically based read-out control systems, said digital memory storage medium being adapted to coact with a programmable computer or a digital processor to conduct the process of claim 1.

* * * * *